Nov. 8, 1927.  1,648,102
H. V. ATWELL
PROCESS OF EXTRACTING FATS
Filed Feb. 27, 1923
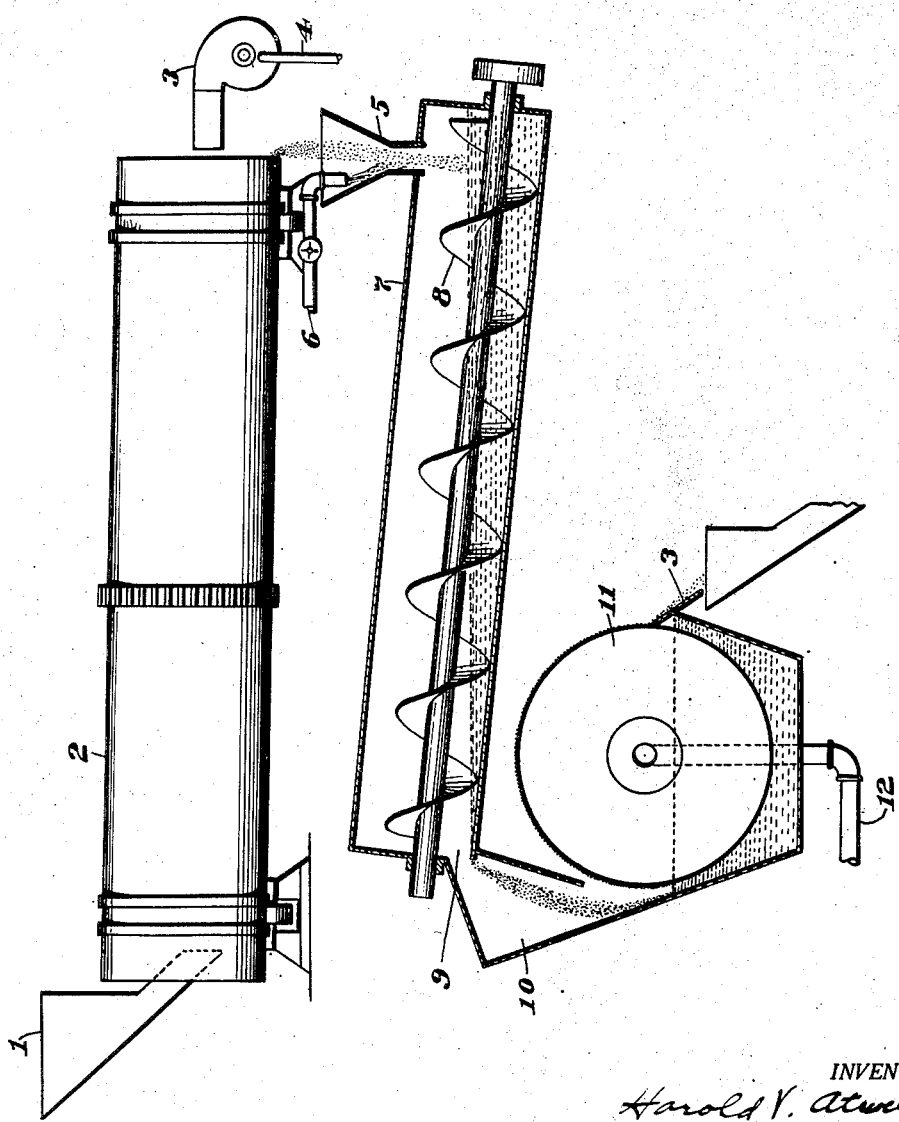
INVENTOR.
Harold V. Atwell,
BY
J. H. McCrady,
His ATTORNEY.

Patented Nov. 8, 1927.

1,648,102

UNITED STATES PATENT OFFICE.

HAROLD V. ATWELL, OF HOLLISTON, MASSACHUSETTS.

PROCESS OF EXTRACTING FATS.

Application filed February 27, 1923. Serial No. 621,679.

This invention relates to processes of extracting fats, oils, waxes, and similar substances, hereinafter for convenience referred to as "fats", from powder or granular materials in which such substances occur. An important commercial example of this process is the extraction of cocoa butter from cocoa powder, and the invention will be disclosed herein as embodied in a process designed particularly for the extraction of cocoa butter, although it will be understood that the process is equally applicable to the recovery of fats from cotton seed meal, peanut meal, and other materials, and that the term "powder" is used herein in a generic sense to include the materials to which this process is applicable.

In attempting to extract fats directly from powdered materials by means of solvents, the subsequent separation of the solid and liquid constituents of the mixture has proved to be a very serious obstacle, the finer particles of solid material filtering or settling out of the solvents only with great difficulty. It has been found, however, that this difficulty can be substantially reduced by first mixing the powder with sufficient water to form a paste and then extracting this paste with a solvent or solvents for the fatty constituents of the powder, benzol being commonly used. This has been the usual process heretofore practiced commercially.

This process is open to the objection, however, that it is expensive in power consumed since it is difficult to mix either the dry powder with water or the resulting paste with solvent. A further objection to this process is that the mixing of the water with the powder is a rather delicate operation since if an insufficient quantity of water is used, the material will not be uniformly moistened, while the use of too much water interferes with the subsequent settling or filtering operations. In actual practice much trouble also is experienced with the preliminary mixing of the powder with water due to the tendency of the mixing apparatus to produce a "lumpy" mixture, the outer surfaces of the lumps being too wet, while the interior is practically dry. This prior process also must be performed in batches, as distinguished from being continuous.

The present invention has for its chief object to devise an improved process of extracting fats from materials of the character described which will overcome the objections above mentioned. The invention aims particularly to devise a thoroughly practical process of this character which can be practiced continuously and in which a very complete and efficient extraction of the fats will be realized.

I have found that these objects can be accomplished by humidifying the powder as distinguished from making a paste of it. The proper degree of humidification will vary with different materials, but it should not be enough to make the material pasty. For instance, in extracting cocoa butter from cocoa powder, it has been customary to mix the cocoa powder with from 80% to 100% of its weight of water. I have found, however, that the extraction process can be carried on more efficiently and more economically by humidifying the powder with only about 20% by weight of water. This humidification may be effected by exposing the powder to a humid atmosphere such as steam, water vapor, or a fog or mist of water suspended in air. This may be advantageously accomplished by manipulating or working the powder continuously through a device similar to a horizontal rotary kiln, the powder moving through the apparatus either in the same direction or counter to a current of steam or humid air. As to the temperature at which the material is treated with the steam or humid atmosphere, no special temperature is necessary. The treatment can be carried on at ordinary room temperatures.

After the humidification has been effected the moist or humidified powder is next mixed with a relatively large quantity of a solvent for the fatty constitutent of the powder preferably a solvent non-miscible with water, such as benzol, and the entire mixture is filtered or allowed to settle to separate the solvent, with the fat dissolved therein, from the solid constituents of the mixture. Preferably this separation is effected in a continuous filter. Usually the humidified powder must be extracted with a solvent several times in order to recover the desired percentage of fat contained in the powder. The extraction step of the process may be carried on in any suitable manner, the present invention dealing more particularly with the preparation of the powder for the solvent extraction.

By stopping the moistening of the powder before the pasty state is reached, I find that the material is much more thoroughly extracted by the solvent in the subsequent extraction step. The solvent comes into more intimate contact with all the particles of the powder to be extracted, and a more complete extraction of the fats in each extraction step is realized. Furthermore, the humidification of the powder can be performed more economically than can the mixing of the powder with water to form a paste. A saving in power also is effected in the mixing of the humidified powder with the solvent since this mixture can be stirred with much lower power consumption than can the mixture of paste and solvent. A further saving in the cost of processing is effected in the removal of water from the defatted residue in order to render it dry and saleable, since a very much smaller quantity of water must be removed from the powder than in prior processes.

It will readily be appreciated by those skilled in this art that all the steps of the process provided by this invention can be carried out continuously in known apparatus. A very much larger quantity of material, therefore, can be handled with a given equipment and in a given time than has been possible with prior processes in which the material must be treated in batches.

The single figure of the accompanying drawings shows diagrammatically the general organization of an apparatus with the aid of which this invention may be practiced. The powdered material to be treated is fed through the hopper 1 into the rotary drum 2 where it is moistened by contact with humidified air. This air may be suitably supplied by a blower 3, into the casing of which steam is introduced by the pipe 4. The moistened material is discharged from the lower end of the inclined drum 2 and falls through the hopper 5 into the extraction chamber 7. Solvent is introduced into this chamber through the pipe 6. A thorough mixing of the solvent with the powder is produced by the rotating screw 8 which also transfers the mixture of sludge and solution through the discharge opening 9 and into the passageway 10 that guides the material into the continuous rotary filter 11. In this filter the solvent with the constituents dissolved therein are withdrawn through the pipe 12, and the solid residue is removed from the surface of the filter by the scraper 13.

No attempt has been made to disclose the details of the apparatus since such details, and in fact the organization of the apparatus, will vary with the conditions under which the process is carried out, the nature of the materials handled, the individual preferances of those in charge of the operations, and other practical considerations.

Having thus described my invention, what I desire to claim as new is:

1. That improvement in the process of extracting fats from fat bearing powder of vegetable origin, which consists in moistening the powder with water while avoiding the wetting of it sufficiently to form a paste, and then treating the moistened powder with a solvent for the fat contained therein to extract said fat from the powder.

2. That improvement in the process of extracting fats from fat bearing powder of vegetable origin, which consists in moistening the powder with water while still maintaining it in a powdered condition, then treating said moistened powder with a solvent for the fat contained therein to extract said fat from the powder, and subsequently separating said solvent, with the fat dissolved therein, from the powder.

3. That improvement in the process of extracting fats from fat bearing powder of vegetable origin, which consists in subjecting substantially all parts of the powder to the action of an atmosphere laden with water vapor until the entire body of powder has reached a non-pasty moist condition, and then treating said moistened powder with a solvent for the fat contained therein to extract said fat from the powder.

4. That improvement in the process of extracting fats from fat bearing powder of vegetable origin, which consists in manipulating the powder in a current of air carrying water vapor until it reaches a thoroughly moistened non-pasty condition, then treating said moistened powder with a solvent for the fat contained therein to extract said fat from the powder, and subsequently separating said solvent, with the fat dissolved therein, from the powder.

5. That improvement in the process of extracting fats from fat bearing powder of vegetable origin, which consists in moistening the powder with water while avoiding the wetting of it sufficiently to form a paste, then treating the moistened powder with a solvent for the fat contained therein to extract said fat from the powder, and performing the foregoing steps continuously.

HAROLD V. ATWELL.